US012539473B2

(12) United States Patent
Hindman

(10) Patent No.: US 12,539,473 B2
(45) Date of Patent: Feb. 3, 2026

(54) ROLLER FOR CHAIN AND SCRAPER ASSEMBLY

(71) Applicant: Evoqua Water Technolgoies LLC, Pittsburgh, PA (US)

(72) Inventor: Donald Hindman, Menomonee Falls, WI (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 328 days.

(21) Appl. No.: 18/277,882

(22) PCT Filed: Feb. 22, 2022

(86) PCT No.: PCT/US2022/017202
§ 371 (c)(1),
(2) Date: Aug. 18, 2023

(87) PCT Pub. No.: WO2022/178375
PCT Pub. Date: Aug. 25, 2022

(65) Prior Publication Data
US 2024/0131451 A1    Apr. 25, 2024
US 2024/0226774 A9    Jul. 11, 2024

Related U.S. Application Data

(60) Provisional application No. 63/152,001, filed on Feb. 22, 2021.

(51) Int. Cl.
*B01D 21/24*    (2006.01)
*B01D 21/20*    (2006.01)
(Continued)

(52) U.S. Cl.
CPC ......... *B01D 21/2455* (2013.01); *B01D 21/20* (2013.01); *B01D 21/2438* (2013.01); *B65G 19/20* (2013.01); *F16G 13/06* (2013.01)

(58) Field of Classification Search
None
See application file for complete search history.

(56) References Cited

U.S. PATENT DOCUMENTS 4,099,424 A    7/1978    Pemberton
4,950,398 A    8/1990    Wiegand et al.
(Continued)

FOREIGN PATENT DOCUMENTS

| DE | 102008003298 A1 | 7/2009 |
| KR | 20210035999 A | 4/2021 |
| WO | 2018148349 A1 | 8/2018 |

OTHER PUBLICATIONS

International Search Report, in corresponding PCT/US22/17202, dated May 11, 2022.
(Continued)

*Primary Examiner* — Krishnan S Menon

(57) ABSTRACT

A settling basin of a wastewater treatment system, the settling basin comprises a collector chain for driving a plurality of flights through the settling basin, the collector chain including chain links comprising a plurality of side bars including a plurality of inner pairs of side bars and a plurality of outer pairs of side bars, and connecting pins configured to join the plurality of side bars, each connecting pin including a first end and a second end on an opposite end of the connecting pin from the first end, and flanged rollers disposed on the connecting pins between the first ends and second ends.

19 Claims, 17 Drawing Sheets

(51) Int. Cl.
*B65G 19/20* (2006.01)
*F16G 13/06* (2006.01)

(56) References Cited

U.S. PATENT DOCUMENTS

| | | |
|---|---|---|
| 5,806,658 A | 9/1998 | Hannum |
| 6,855,080 B2 | 2/2005 | Kanehira et al. |
| 2008/0000758 A1 | 1/2008 | Nakagawa et al. |
| 2020/0384385 A1 | 12/2020 | Hindman et al. |

OTHER PUBLICATIONS

Accettola, Francesca, "Extended European Search Report", European Patent Application No. 22757080.1, mailed Sep. 10, 2024.
Tsubaki: "The Complete Guide to Chain", Dec. 31, 1997 (Dec. 31, 1997), XP055207930, ISBN: 978-0-96-589320-6 Retrieved from the Internet: URL: http://www.ustsubaki.com/pdf/The Chain Book Catalog_small.pdf; pp. 50, 51, 103, 220-227.

ROLLER FOR CHAIN AND SCRAPER ASSEMBLY

BACKGROUND

1. Field of Disclosure

Aspects and embodiments disclosed herein are directed generally to wastewater treatment systems which utilize settling basins and to apparatus and methods for operating settling basins.

2. Discussion of Related Art

Chain and scraper sludge collector equipment is designed to remove settled suspended solids (sludge) from rectangular settling basins, for example, rectangular concrete settling basins, in municipal and industrial water and wastewater treatment plants. In some implementations, rectangular settling basins may be from about 10 feet (3 meters) to about 30 feet (9.1 meters) wide, from about 50 feet (15.2 meters) to about 300 feet (91.4 meters) long, and from about eight feet (2.4 meters) to about 14 feet (4.3 meters) deep. Scraper flights are often used to scrape settled material on the basin floor to a sludge withdrawal location, for example, a hopper in the settling basin. Concurrently with the removal of sludge from the basin floor, other scraper flights may be utilized to push floating material, referred to generally as "scum," from the surface of liquid in the settling basin to a scum collector for removal.

The sludge and scum removal mechanism in a settling basin often includes two endless strands of chain that run the length of the settling basin. Scraper flights that span the width of the settling basin are mounted to the chain. The chain and the flights attached to the chain move through the settling basin to direct the sludge to the sludge withdrawal location in the floor at one end of the basin. The chain and flights are propelled by sprockets that are affixed to a headshaft that spans the width of the settling basin.

SUMMARY

In accordance with an aspect of the present disclosure there is provided a settling basin of a wastewater treatment system. The settling basin comprises a collector chain for driving a plurality of flights through the settling basin. The collector chain includes chain links comprising a plurality of side bars including a plurality of inner pairs of side bars and a plurality of outer pairs of side bars, connecting pins configured to join the plurality of side bars, each connecting pin including a first end and a second end on an opposite end of the connecting pin from the first end, and flanged rollers disposed on the connecting pins between the first ends and second ends.

In some embodiments, the flanged rollers include tubular central portions and end portions including flanges.

In some embodiments, the flanges include planar outer faces configured to engage inner sides surfaces of the plurality of inner pairs of side bars.

In some embodiments, the flanges include internally facing ramped sections having surfaces disposed at an angle of between 30° and 60° relative to a surface of the central portions of the flanged rollers.

In some embodiments, the flanges extend to heights above outer surfaces of the central portions of greater than zero inches and up to a height corresponding to widths of sidewalls of the plurality of inner pairs of side bars.

In some embodiments, the height corresponding to widths of sidewalls of the plurality of inner pairs of side bars is two inches.

In some embodiments, the settling basin further comprises sprockets that the collector chain passes over, the central portions of the flanged rollers having widths corresponding to a width of a widest of the sprockets.

In some embodiments, the settling basin further comprises one or more circumferential grooves defined in the central portions of the flanged rollers.

In some embodiments, the flanged rollers are free to rotate about axes of the connecting pins.

In some embodiments, the flanged rollers are formed of stainless steel.

In some embodiments, the flanged rollers are formed of one of a fiber reinforced composite, acetal, or nylon, or other materials suitable to the environment.

In accordance with another aspect, there is provided collector chain for driving a plurality of flights through a settling basin of a wastewater treatment system. The collector chain includes chain links comprising a plurality of side bars including a plurality of inner pairs of side bars and a plurality of outer pairs of side bars, connecting pins configured to join the plurality of side bars, each connecting pin including a first end and a second end on an opposite end of the connecting pin from the first end, and flanged rollers disposed on the connecting pins between the first ends and second ends.

In some embodiments, the flanged rollers include tubular central portions and end portions including flanges.

In some embodiments, the flanges include planar outer faces configured to engage inner sides surfaces of the plurality of inner pairs of side bars.

In some embodiments, the flanges include internally facing ramped sections having surfaces disposed at an angle of between 30° and 60° relative to a surface of the central portions of the flanged rollers.

In some embodiments, the flanges extend to heights above surfaces of the central portions of greater than zero inches and up to a height corresponding to widths of sidewalls of the plurality of inner pairs of side bars.

In some embodiments, the height corresponding to widths of sidewalls of the plurality of inner pairs of side bars is two inches.

In some embodiments, the collector chain further comprises sprockets that the collector chain passes over, the central portions of the flanged rollers having widths corresponding to a width of a widest of the sprockets.

In some embodiments, the collector chain further comprises one or more circumferential grooves defined in the central portions of the flanged rollers or cross grooves for additional debris removal.

In some embodiments, the flanged rollers are free to rotate about axes of the connecting pins.

In some embodiments, the flanged rollers are formed of stainless steel.

In some embodiments, the flanged rollers are formed of one of a fiber reinforced composite, acetal, nylon, or other material suitable to the environment.

In accordance with another aspect, there is provided a method of retrofitting a settling basin of a wastewater treatment system. The method comprises replacing one or more rollers disposed on connector pins of links of a collector chain of the settling basin with one or more respective flanged rollers.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
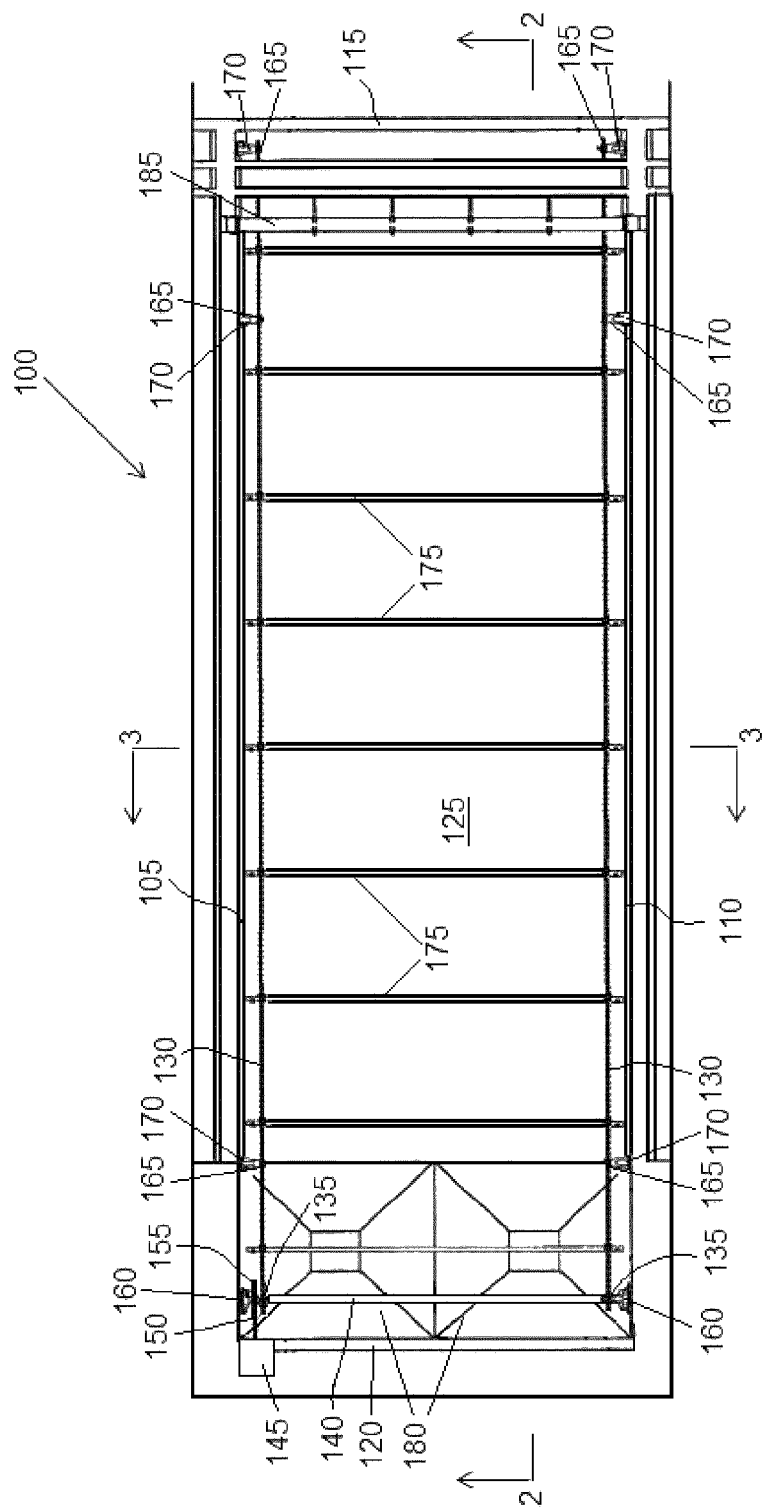
FIG. 1 is a plan view of an embodiment of a wastewater treatment plant settling basin.

Aspects and embodiments disclosed herein are not limited to the details of construction and the arrangement of components set forth in the following description or illustrated in the drawings. Aspects and embodiments disclosed herein are capable of other embodiments and of being practiced or of being carried out in various ways.

Collector chains utilized in settling basins of wastewaters treatment plants may be subjected to harsh conditions. The liquid in a settling basin may exhibit swings in pH and/or changes in temperature from day to night or from season to season. Collector chains are also subject to mechanical stresses and repetitive vibrational stress associated with being driven through the settling basin.

Collector chains for use in settling basins of wastewater treatment plants desirably exhibit a number of properties. The collector chains are advantageously lightweight to facilitate installation or replacement and to minimize power utilized to drive the collector chains and attached flights through the settling basins. A collector chain should be mechanically strong along its entire length to resist deformation due to stress associated with being driven through the settling basin. A collector chain is desirably corrosion resistant so that it is not affected by the environment in the settling basin nor does it affect the environment due to its presence there. A collector chain should have few parts to facilitate installation or replacement and to reduce a number of possible failure points. A collector chain should also be resistant to accumulation of debris, for example, fibrous matter or rags in a settling basin. Accumulation of such debris in the collector chain may increase drag on the chain as it is driven through the settling basin, thus increasing the power used to drive the chain though the settling basin. Accumulation of such debris in the collector chain may also interfere with the passage of the collector chain over sprockets in the settling basin, potentially increasing power consumption, stoppage of the collector chain, or damage to the collector chain or sprockets.

One possible material from which a collector chain may be formed is metal. Settling basin collector chains have typically been fabricated out of carbon steel or stainless steel. The weight of the metal collector chains, however, is often substantial, and a large amount of power may be utilized to drive metal collector chains through a settling basin. The weight of the metal collector chains often requires the use of strong and heavy sprockets and associated mounting equipment, which may result in a settling basin having a high capital cost. The weight of the metal collector chains often makes maintenance difficult when the metal collector chains are to be removed and/or replaced. When carbon steel is used, corrosion can be a problem since the metal collector chains are normally not painted or otherwise treated for corrosion protection. If a corrosion resistant metal collector chain is desired, the collector chain may be constructed from stainless steel. The use of stainless steel, however, is costly due to the expense of the material and the difficulty of machining stainless steel as compared to carbon steel.

Another material from which a collector chain may be formed is engineering plastic (hereinafter, referred to as "plastic"). Plastics are typically corrosion resistant and generally lighter than most metals. Further, plastic collector chains can be either machined or molded, which reduces the cost of construction as compared to conventional steel collector chains. Most plastics, however, do not possess the mechanical strength desirable in a settling basin collector chain. A plastic collector chain may deform over time due to forces associated with driving the collector chain and flights through a settling basin.

Collector chains may be formed of ceramic materials. Ceramics are typically corrosion resistant and strong. Ceramics, however, typically have poor impact resistance and may shatter when experiencing a sharp force or crack after being subjected to repetitive vibrational stress.

Composite materials, for example, fiber reinforced plastics or metals embedded with ceramic materials may be strong, impact resistant, corrosion resistant, and lightweight. Many composite materials may be molded, which reduces the cost of construction as compared to conventional steel collector chains which may require machining. One drawback of many composite collector chains, however, is their cost relative to collector chains formed of common metals, for example, carbon steel or many plastics. Some forms of composite, however, are not excessively expensive and may provide an acceptable tradeoff between cost and mechanical properties desirable in a collector chain that may be superior to those of pure metal, plastic, or ceramic materials.

Aspects and embodiments disclosed herein involve utilizing a collector chain formed of a composite material (a "composite collector chain") in designs of chain and scraper sludge collector equipment in wastewater treatment plant settling basins instead of a conventional solid steel collector chain. The composite material may be a polymer matrix composite, for example, a nylon or epoxy matrix composite, a metal matrix composite, for example an aluminum or steel matrix composite, or a ceramic matrix composite, for example, a glass or alumina matrix composite. The composite material may include fibers, for example, glass, metal, carbon, aramid, or boron fibers embedded in the matrix. The composite material may include particles, for example, metal, polymer, or ceramic particles embedded in the matrix. In some embodiments, the composite is filament wound fiberglass reinforced plastic (FRP).

Aspects and embodiments disclosed herein may include a chain-drive assembly for use in a settling basin at least partially filled with wastewater. A chain-drive assembly disposed in the settling basin may include a parallel composite collector chains carrying flights and extending along both the bottom of the settling basin to remove settled sludge and at the surface of wastewater in the settling basin to collect and remove surface scum. The collector chains may include features to reduce the potential for the accumulation of debris in the links of the collector chains as compared to prior designs.

Other portions of the chain and scraper sludge collector equipment, for example, the headshaft, the flights, the bull sprocket, collector headshaft sprockets, idler sprockets, sprocket key elements, and/or wall bearings or stub posts may be formed of metal, for example, steel. In other embodiments any one or more of these portions of the chain and scraper sludge collector equipment may be formed of a polymer or a composite material, similar to that from which one or more portions of the collector chain may be formed.

Illustrated in FIG. 1 is a rectangular settling basin 100 which may be utilized in a wastewater treatment plant for the settling and removal of suspended solids from wastewater undergoing treatment. The settling basin 100 includes an opposed pair of sidewalls 105, 110, a pair of end walls 115, 120, and a bottom surface 125. A pair of parallel collector chains 130 are driven by a headshaft 140. The collector chains 130 engage the headshaft through collector headshaft sprockets 135 secured to the headshaft 140 proximate opposite ends of headshaft 140. The collector chains 130 may also engage idler sprockets 165 which may rotate freely in wall bearings or about stub posts 170 secured to the sidewalls 105, 110 of the settling basin 100.

A motor, for example, an electric motor 145 external to the settling basin 100 drives a drive chain 150 which engages a bull sprocket 155 secured to the headshaft 140 proximate an end thereof to rotate the headshaft 140. The headshaft 140 is supported by and rotates about headshaft mounts, for example, stub posts 160 secured to the sidewalls 105, 110 of the settling basin 100.

A series of sludge and scum collector flights 175 are connected at opposite ends to the collector chains 130. In operation, the flights 175 collect sludge from the bottom surface 125 of the settling basin 100 and direct it into sludge hoppers 180 for removal. The flights 175 also skim the top surface of liquid in the settling basin and direct floating scum into a scum collector, for example, a scum pipe assembly 185.

Figure 2:
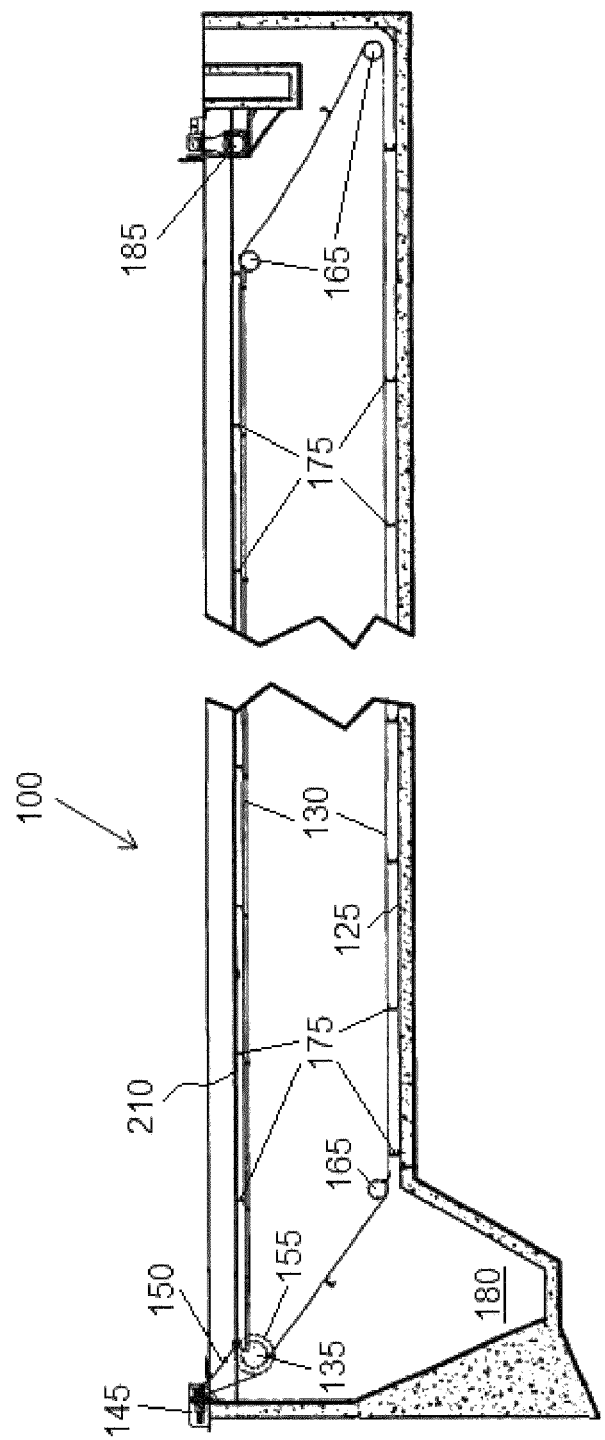
FIG. 2 is a cross sectional broken view of the settling basin of FIG. 1 along line 2-2 of FIG. 1.

The settling basin 100 is illustrated in cross section along line 2-2 of FIG. 1 in FIG. 2. The collector chain 130, as illustrated in FIG. 2, travels in a clockwise direction about the collector headshaft sprocket 135 and idler sprockets 165. The flights 175 both scrape settled sludge (not shown) from the bottom surface 125 of the settling basin 100 into the sludge hopper 180 and skim scum (not shown) from the surface 210 of liquid in the settling basin 100 and direct it to the scum pipe assembly 185.

Figure 3:
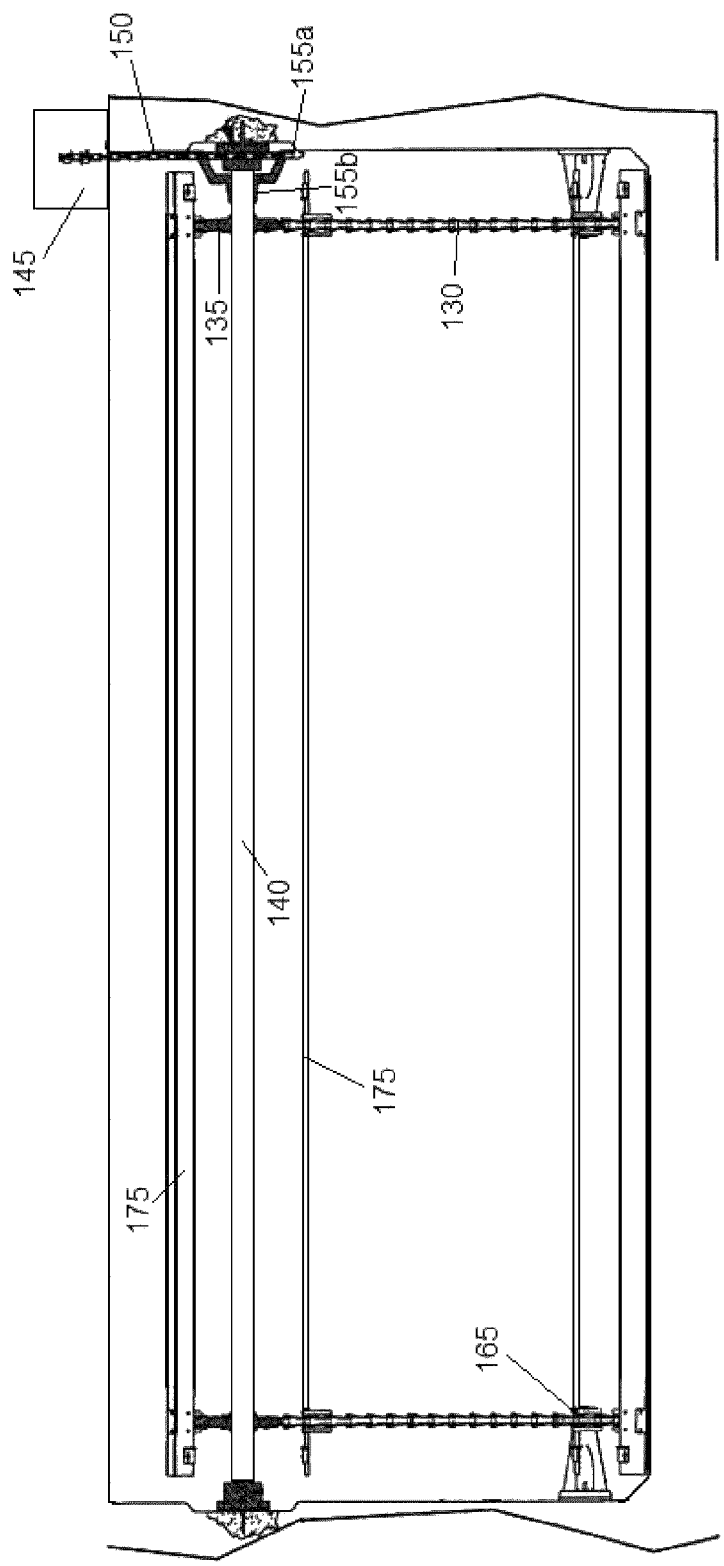
FIG. 3 is another cross sectional view of the settling basin of FIG. 1 along line 3-3 of FIG. 1.

The settling basin 100 is illustrated in cross section along line 3-3 of FIG. 1 in FIG. 3. In FIG. 3 the drive chain 150 can be seen engaging the bull sprocket 155 secured to the headshaft 140. In the embodiment illustrated in FIG. 3, the bull sprocket 155 is configured with an external tooth section 155a which engages the drive chain 150 that is horizontally displaced toward a wall of the settling basin 100 from a base portion 155b where it is connected to the headshaft 140.

Figure 4:
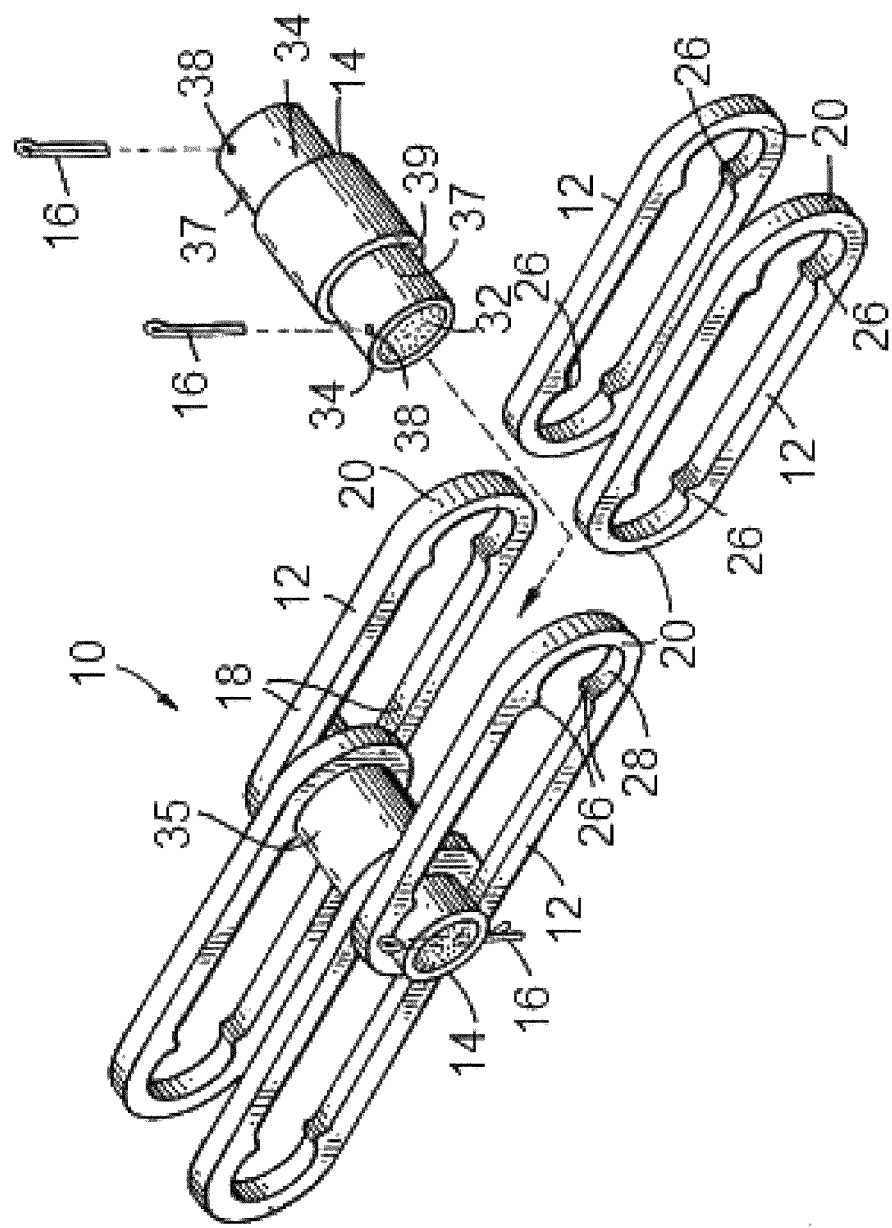
FIG. 4 is a partially exploded isometric view of a chain link assembly that may be utilized in the wastewater treatment plant settling basin of FIG. 1.

An example of a collector chain 130 that may be utilized in the settling basin 100 is described in U.S. Pat. No. 4,863,418 (the '418 patent), which is incorporated by reference herein in its entirety. An illustration of a chain link assembly of the example collector chain presented in the '418 patent is reproduced FIG. 4 generally at 10. The chain link assembly 10 includes two identical side bars 12 each having the shape of a flattened open loop with a pair of straight and parallel center sections 18 integrally connected by curved end sections 20. The side bars 12 are joined by a connecting pin 14 and are retained on the connecting pin 14 by cotter pins 16 extending through each end of the connecting pin 14.

Each side bar 12 is formed of a hardened resin matrix of, for example, a thermosetting polyester or epoxy resin. The matrix material is reinforced by high tensile strength, continuous filaments, for example, glass, steel, carbon, or aramid filaments which have been wound in parallel paths around the loop.

The side bars 12 include integral, inwardly extending projections 26 of hardened resin which extend the interior curved surface 28 of the end sections 20 to a circular arc greater than 180°. These projections 26 serve to locate and maintain the end of the pin 14 longitudinally and concentrically at the ends of the side bars 12.

The connecting pin 14 consists of a cylindrical core 32 having a polymeric sleeve 34 and a pair of drilled holes 38 at its ends for receiving cotter pins 16. The core 32 is preferably a composite of a hardened thermoset resin reinforced by high strength filamentary material extending in the direction of the longitudinal axis of the core. The pin 14 also includes a sleeve 34 comprised of a low friction plastic material, which surrounds the core 32 to form a wear resistant coating or sleeve around the core.

The sleeve 34 includes an integral central barrel portion 35 adapted to engage the sprocket teeth, the central barrel portion of the sleeve having a material thickness greater than the material thickness of the opposite ends 37 of the sleeve, and the opposite ends 39 of the central portion 35 of the sleeve define shoulders adapted to be engaged by the sides of an inner pair of side bars 12, the shoulders 39 and barrel portion 35 maintaining the side bars 12 in spaced apart relation The '418 patent discloses that embodiments of the disclosed collector chain of comparable size and similar geometry to prior art chains has been shown to have an ultimate strength of nearly 40,000 lbs. (18,144 kg) and is expected to have a working rating of 6000 lbs. force (26,689 Newtons), which is greater than that of cast iron chains.

Various improvements may be made to the collector chain disclosed in the '418 patent. It has been discovered that it may be possible to reduce the number of individual parts forming a collector chain as compared to that disclosed in the '418 patent, which may have about 24 parts per foot (about 79 parts per meter) of chain. It has also been discovered that the exposed cotter pins and the open loops of the side bars of the collector chain disclosed in the '418 patent may undesirably tend to snag or collect debris such as rags or other fibrous debris when traveling through a settling basin. This collected debris may stress the links of the collector chain as it moves through a settling basin and may eventually cause a chain link to fail. The repair costs associated with such failures are significant, sometimes about $50,000 or more due to the need to drain and sanitize the settling basin prior to performing repairs.

Figure 5A:
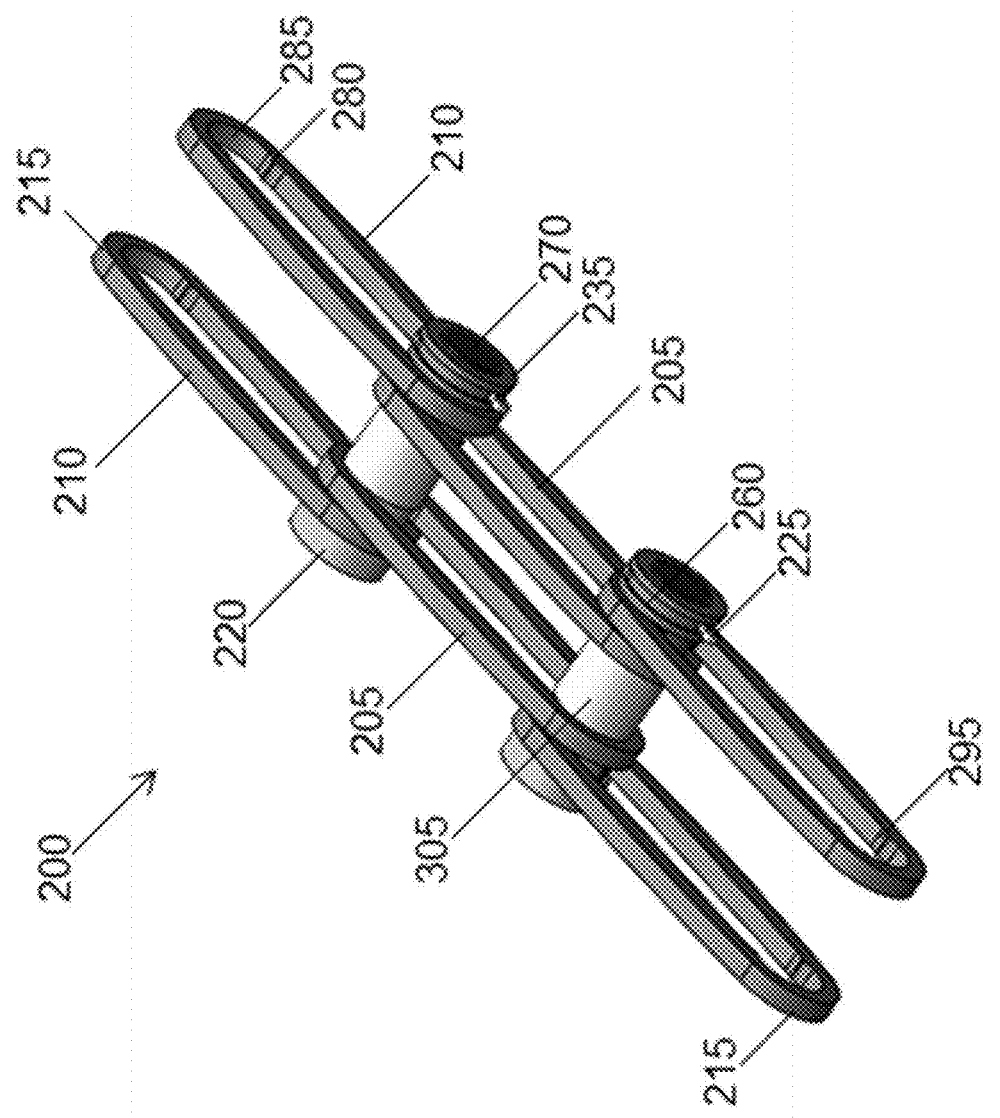
FIG. 5A is an isometric view of another chain link assembly that may be utilized in the wastewater treatment plant settling basin of FIG. 1.
Figure 5B:
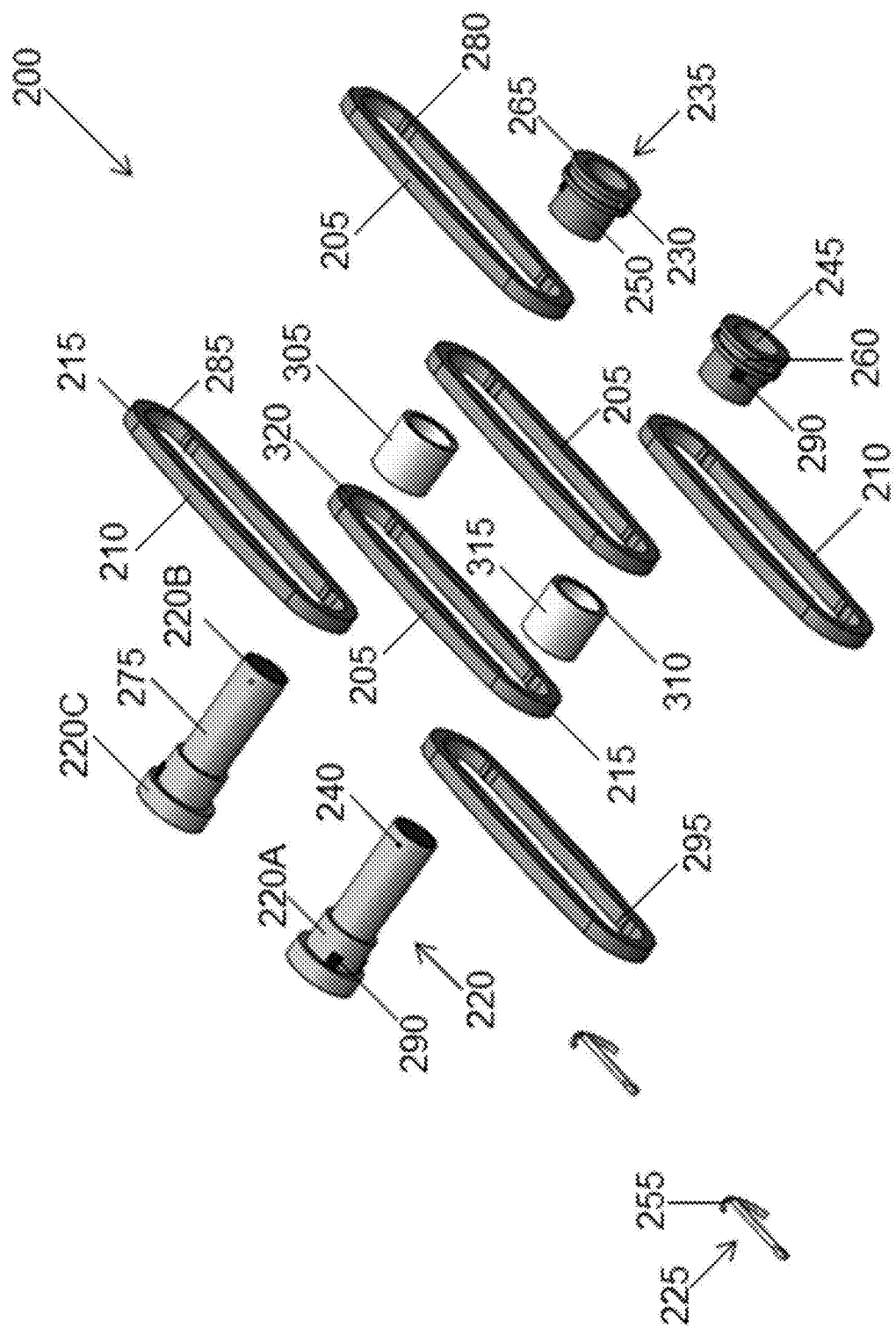
FIG. 5B is an exploded view of the chain link assembly of FIG. 5A.
Figure 6:
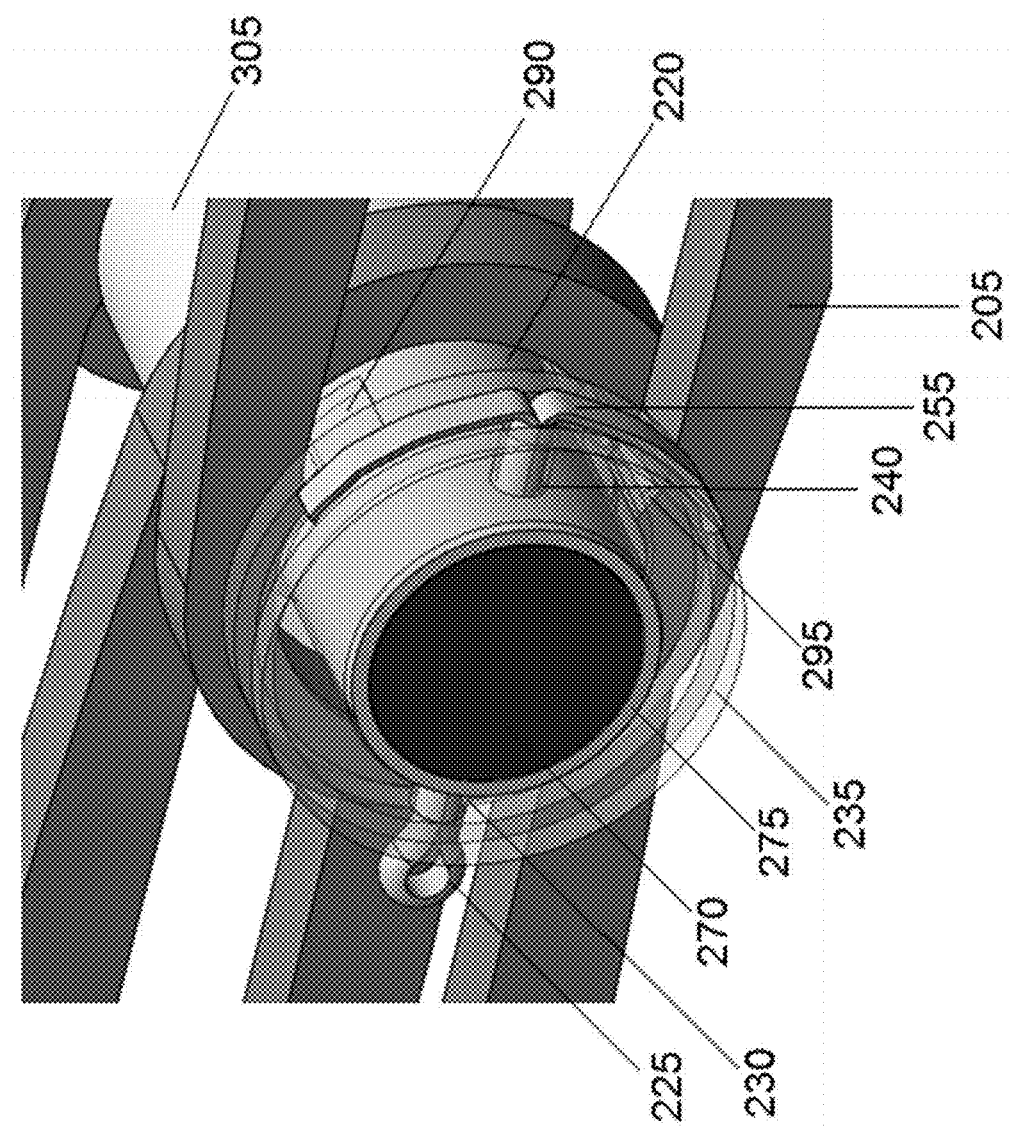
FIG. 6 is an enlarged view of a portion of the chain link assembly of FIG. 5A illustrating an end cap in phantom.

One example of an improved chain link assembly for a settling basin collector chain is illustrated generally at 200 in perspective view in FIG. 5A and in an exploded view in FIG. 5B. The chain link assembly 200 includes side bars 205 having the shape of a flattened open loop with a pair of straight and parallel center sections 210 integrally connected by curved end sections 215. The side bars 205 are joined by stepped connecting pins 220. The stepped connecting pins 220 differ from the connecting pins 14 described in the '418 patent in that retaining elements, for example, cotter pins 225 are utilized only on one side of the stepped connecting pins 220. The stepped connecting pins 220 include stepped portions 220A, non-stepped portions 220B, and a head 220C. The heads 220C have a greater external diameter or cross-sectional area than the stepped portions 220A. The stepped portions 220A have a greater external diameter or cross-sectional area than the non-stepped portions 220B. The cotter pins 225 pass through apertures 230 defined in end caps 235 that connect to the non-stepped portions 220B of the stepped connecting pins 220 and through corresponding passageways 240 defined in the non-stepped portions 220B of the stepped connecting pins 220 proximate terminal ends thereof (FIG. 6).

The non-stepped portions 220B of the stepped connecting pins 220 may be disposed within central bores 245 of reduced diameter or reduced cross-sectional area portions 250 of the end caps 235 or central bores 245 passing through an entirety of the end caps 235. The reduced diameter or cross-sectional area portions 250 of the end caps 235 may have the same or substantially the same diameter or cross-sectional area as the non-stepped portions 220B of the stepped connecting pins 220. In other embodiments, the end caps 235 may extend into recesses or bores defined in the non-stepped portions 220B of the stepped connecting pins 220.

Lower portions 255 of the cotter pins 225 are bent into an arc-shaped configuration after the cotter pins 225 are inserted through the end caps 235 and stepped connecting pins 220. The arc-shaped lower portions 255 of the cotter pins 225 fit into grooves 260 defined in the surface of a larger diameter or cross-sectional area portion 265 (larger in diameter or cross-sectional area than the reduced diameter or cross-sectional area portions 250) of the end caps 235. The lower portions 255 of the cotter pins 225 have a reduced tendency to snag on rags or other debris than standard cotter pins because by being disposed in the grooves 260 rather than protruding from a side of the end caps 235, the grooves 260 prevent the ends of the cotter pins 225 from snagging debris in wastewater in the settling basin.

It should be appreciated that although the stepped connecting pins 220, end caps 235, and portions of each are illustrated as being cylindrical or having circular cross-sections, it should appreciated that one or more portions of either the connecting pins 220 or end caps 235 may have non-circular cross-sections, for example, triangular, square, pentagonal, hexagonal, or oval cross sections, or cross-sections having any other appropriate geometrical shape.

Each side bar 205 is formed of a hardened resin matrix of, for example, a thermosetting polyester or epoxy resin. The matrix material is reinforced by high tensile strength, continuous filaments, for example, glass, steel, carbon, or KEVLAR® para-aramid synthetic fibers which have been wound in parallel paths around the loops of the side bars 205.

The stepped connecting pins 220 may include a core 270 formed of hardened resin matrix of, for example, a thermosetting polyester or epoxy resin reinforced by high tensile strength, continuous filaments, for example, glass, steel, carbon, or KEVLAR® para-aramid synthetic fibers. The core 270 of the stepped connecting pins 220 may be formed by a pultrusion process wherein reinforcing filaments coated with resin are pulled through a die, causing the reinforcing filaments to be aligned in mutually parallel relation and causing the filaments to be compressed together to form a densified core material.

The stepped connecting pins 220 may include a sleeve 275 surrounding the core 270. The sleeve 275 may be formed of nylon or another self-lubricating polymeric material. In other embodiments, the sleeve 275 may be formed of non-corroding metallic materials such as 304SS, 316SS, Nitronic 60, Duplex or Super-duplex stainless steels or a polymer coated metal. The sleeve 275 may optionally be reinforced with high tensile strength, continuous or short, discrete filaments, for example, glass, steel, carbon, or KEVLAR® para-aramid synthetic fibers.

The side bars 205 include integral, inwardly extending projections 280 of hardened resin which extend the interior curved surface 285 of the end sections 215 to a circular arc greater than 180°. These projections 280 serve to locate and maintain the non-stepped portions 220B of the stepped connecting pins 220 and the end caps 235 longitudinally and concentrically at the ends of the side bars 205. The heads of the stepped connecting pins 220 have a larger diameter or cross-sectional area than that of the aperture defined by the interior curved surfaces 285 of the end sections 215 of the side bars 205 and so are prevented from passing through the end sections 215 of the side bars 205 without the need for cotter pins or other fasteners or retaining elements.

Both the stepped portions 220A of the stepped connecting pins 220 and the end caps 235 may include one or more, for example, two or four outwardly extending projections or tabs 290 that engage internal sides 295 of the inwardly extending projections 280 (see FIG. 6) in the outside side bars 205 (the side bars 205 between which are sandwiched other side bars 205) to prevent or suppress relative motion between the stepped connecting pins 220, the end caps 235, and the outside side bars 205. In non-limiting examples, center lines of the tabs may be offset by about 92° about the circumferences of the stepped portions 220A of the stepped connecting pins 220 or endcaps 235. In other embodiments, the projections or tabs may engage corresponding recesses in the outside side bars 205 to prevent or suppress relative motion between the stepped connecting pins 220, the end caps 235, and the outside side bars 205. The lack of relative motion between the stepped connecting pins 220, the end caps 235, and the outside side bars 205 prevents wear on the outer surfaces of the stepped connecting pins 220 and end caps 235, and on the interior curved surfaces 285 of the outside side bars 205. The inside side bars 205 that are sandwiched between the outer side bars 205 are free to rotate about the stepped connecting pins 220 and end caps 235 relative to the outer side bars 205 to allow the collector chain to curve around sprockets in a settling basin.

Rollers 305 may be provided about the stepped connecting pins 220 between the inner side bars 205. The rollers 305 may be free to rotate about the surface of the connecting pins 220 between the inner side bars 205. The rollers 305 may be formed of a hard, corrosion resistant material, for example, stainless steel to prevent or reduce wear on the connecting pins 220 due to contact with sprockets in a settling basin. In other embodiments, the rollers 305 may be formed of a low friction material, for example, nylon, fiber reinforced nylon, or KEVLAR® para-aramid synthetic fibers.

Embodiments of the improved chain link assembly may include 16 parts per foot (53 parts per meter) for embodiments in which the side bars 205 have 8 inch (20.3 cm) total lengths as compared to 24 parts per foot (about 79 parts per meter) of chain as in some prior known settling basin collector chain designs. In a non-limiting example of a settling basin collector chain 200, the side bars 205 have 8 inch (20.3 cm) total lengths with a 6 inch (15.2 cm) center-to-center distance between adjacent stepped connecting pins 220 and heights of 2 inches (5.1 cm). The stepped connecting pins 220 may have overall lengths of about 4.1 inches (10.4 cm) with the stepped portions 220A having lengths of about 0.86 inches (2.2 cm) and diameters of about 1.36 inches (3.45 cm), the non-stepped portions 220B having lengths of about 2.72 inches (6.9 cm), external diameters of about 1.12 inches (2.8 cm) and internal diameters of about 1 inch (2.54 cm), the head 220C having a length of about 0.5 inches (1.3 cm) and a diameter of about 1.75 inches (4.4 cm), and the tabs 290 having lengths of about 0.35 inches (0.9 cm) and heights of about 0.06 inches (0.15 cm). The end caps 235 may have overall lengths of about 1.36 inches (3.45 cm) with the reduced diameter portions 250 having lengths of about 0.86 inches (2.2 cm), outer diameters of about 1.36 inches (3.45 cm), and inner diameters of about 1.15 inches (2.9 cm) and the larger diameter portions 265 having lengths of about 0.5 inches (1.3 cm) and diameters of about 1.75 inches (4.4 cm).

Figure 7A:
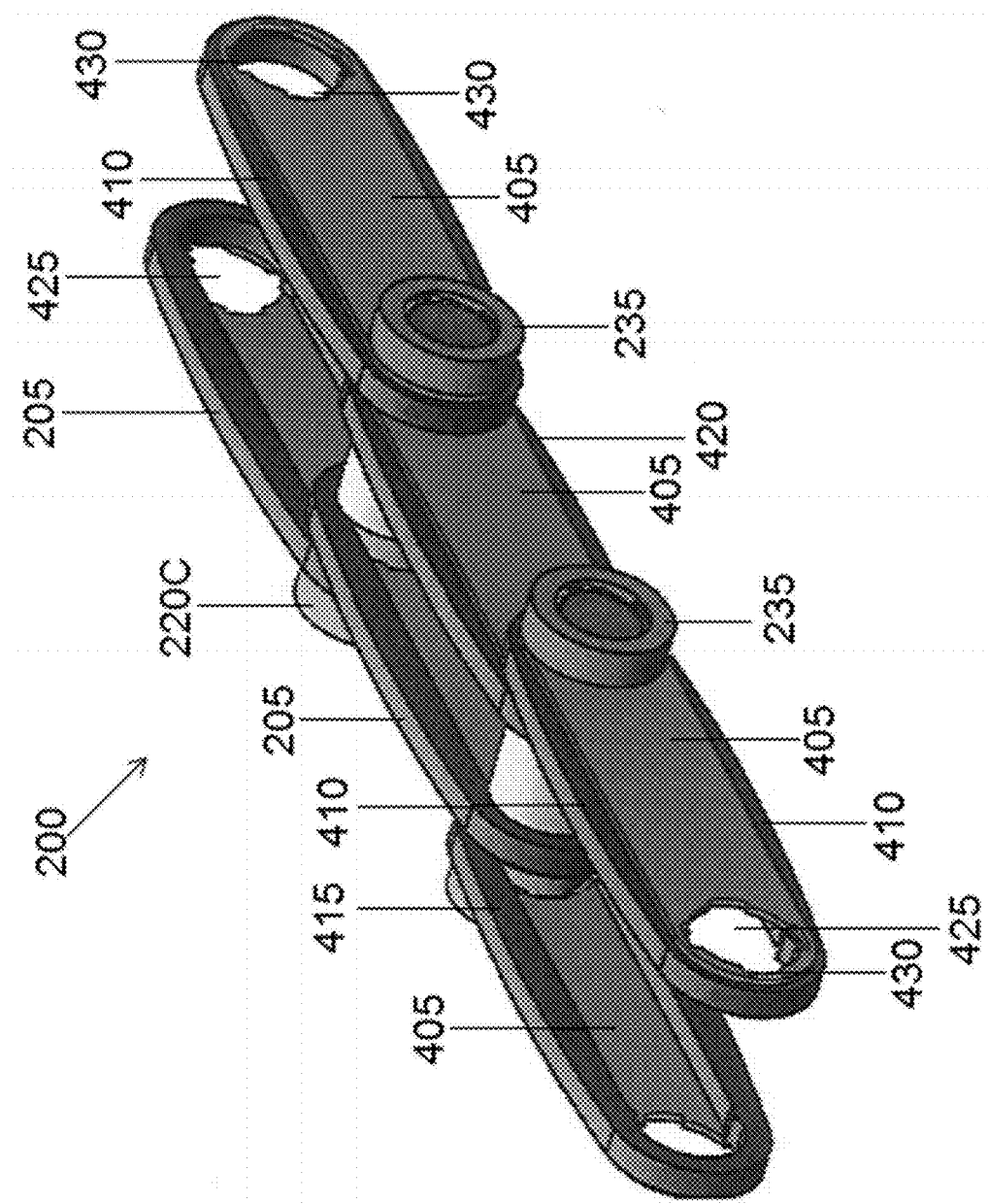
FIG. 7A is an isometric view of a chain link assembly including side covers that may be utilized in the wastewater treatment plant settling basin of FIG. 1.
Figure 7B:
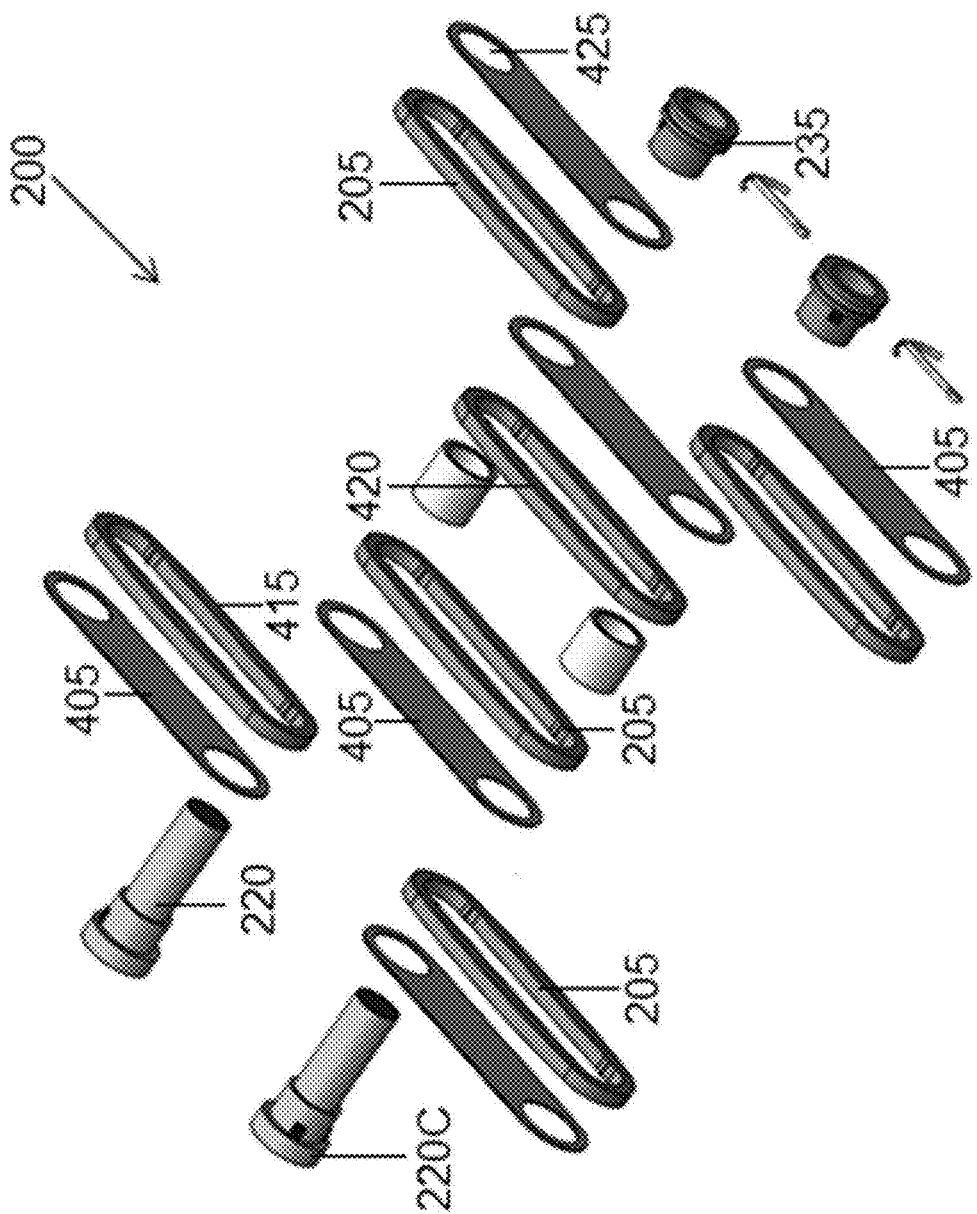
FIG. 7B is an exploded view of the chain link assembly of FIG. 7A.

In some embodiments, the settling basin collector chain 200 may include shield elements to help prevent debris from being caught within the open loops of the individual side bars 205. The shield elements may be in the form of sheets of material. An example of settling basin collector chain 200 including shield elements is illustrated in perspective view in FIG. 7A and in an exploded view in FIG. 7B. As illustrated in FIGS. 7A and 7B the shield elements may include or consist of covers 405 sized and shaped to align with sides of the side bars 205 and block the open space within the open loops of the individual side bars 205. The covers 405 may be disposed on outer sidewalls of the individual side bars 205. The covers 405 may be held in place on the outer side bars 205 on one side of the collector chain 200 between the heads 220C of the stepped connecting pins 220 and outer sidewalls 410 of the outer side bars 205 and on the outer side bars 205 on the other side of the collector chain 200 between the end caps 235 and outer sidewalls 410 of the outer side bars 205. The covers 405 on the outside of the inner side bars 205 may be sandwiched between inner walls 415 of the outer side bars 205 and outer walls 420 of the inner side bars 205.

The covers 405 may include apertures 425 to receive the stepped portions 220A of the stepped connecting pins 220 or the reduced diameter portions 250 of the end caps 235. The apertures 425 of the covers 405 may include recesses 430 sized and shaped to receive the projections or tabs 290 of the stepped connecting pins 220 and end caps 235.

The covers 405 may be formed of a polymeric material, for example, polytetrafluoroethylene (PTFE), nylon, or another suitable polymer.

In some embodiments, as illustrated in FIGS. 7A and 7B, covers 405 are distinct or formed separately from other portions of the collector chain. In other embodiments, the covers 405 may be formed integral with one or more of the side bars 205, stepped connecting pins 205, or end caps 235.

Figure 8:
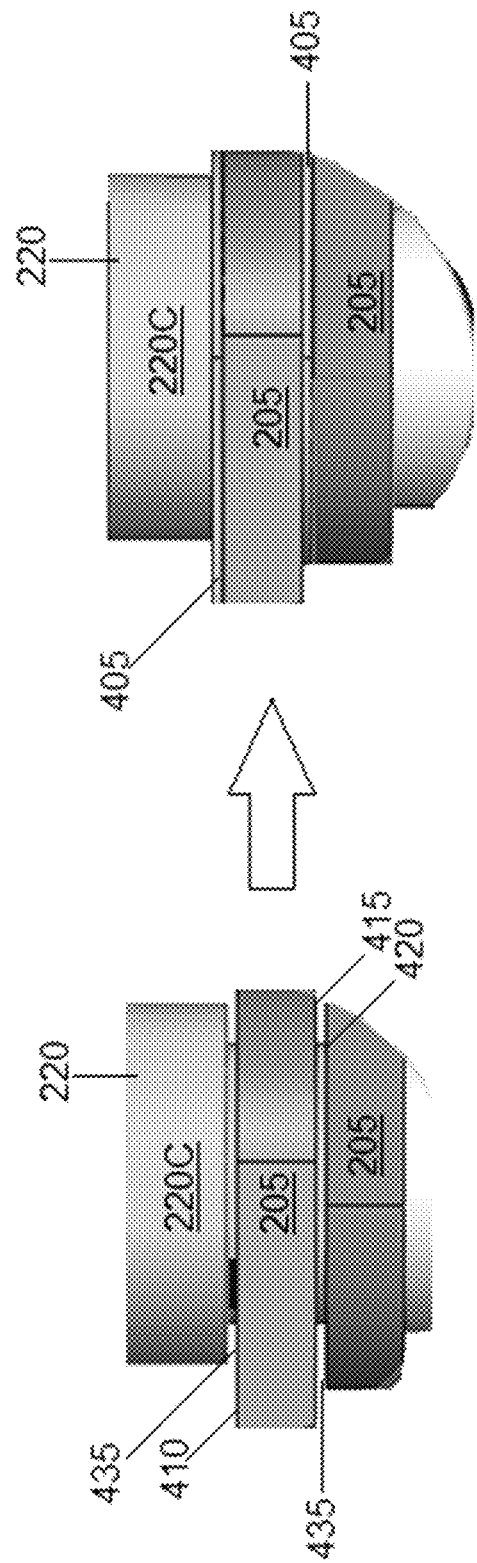
FIG. 8 is a comparison between a portion of the chain link assembly of FIG. 7A including the covers and without the covers installed.
Figure 9:
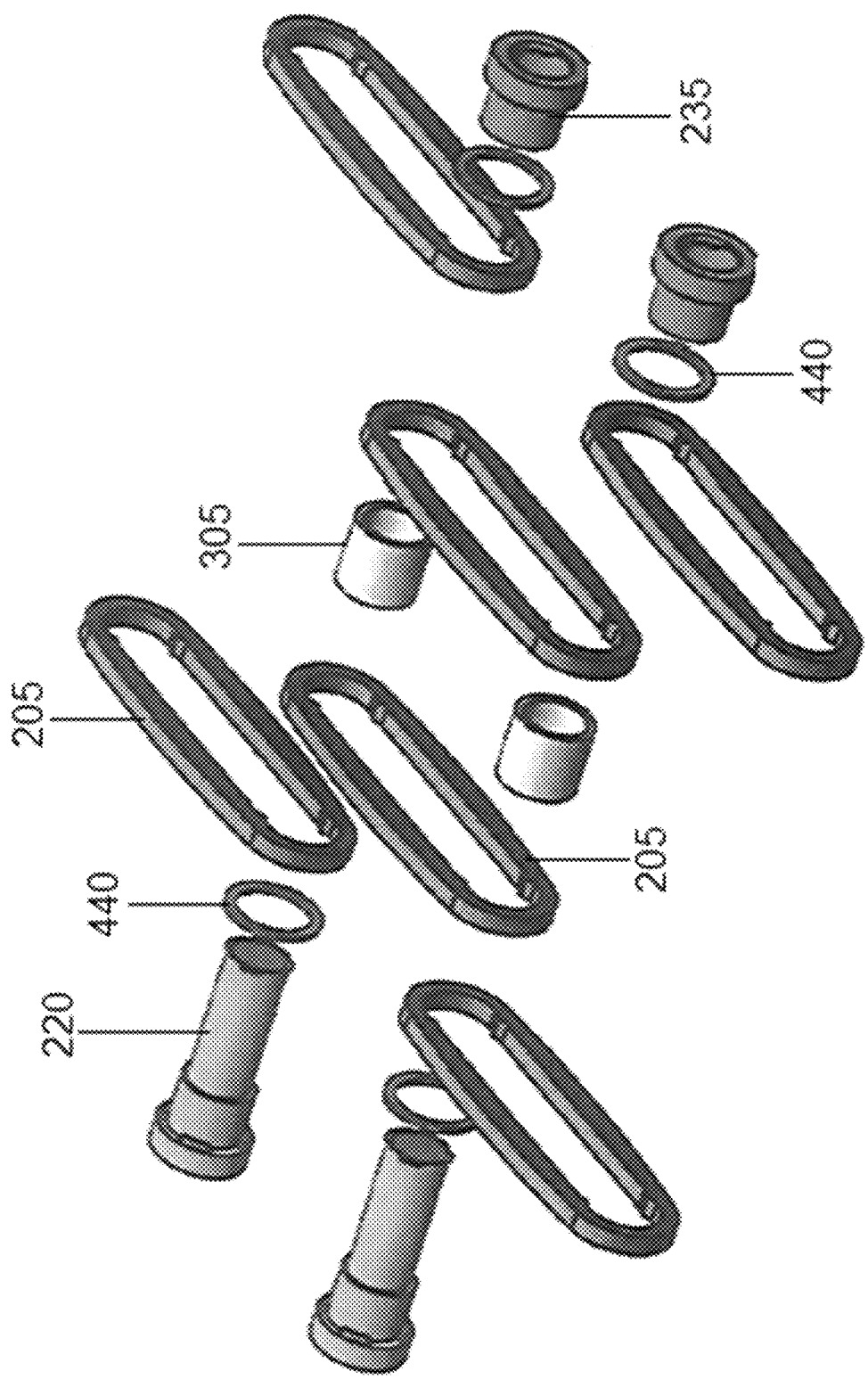
FIG. 9 is an exploded view of the chain link assembly of FIG. 7A with the covers replaced by washers.

In some embodiments, the components of the settling basin collector chain 200 may be configured to provide a customer with a choice of whether or not to install covers 405 on faces of the side bars 205. As illustrated in FIG. 8, one or more components of the settling basin collector chain 200, for example, the connecting pins 220 may be sized to provide gaps 435 between the heads 220C of the connecting pins 220 and the outer sidewalls 410 of the outer side bars 205 and/or between the inner walls 415 of the outer side bars 205 and outer walls 420 of the inner side bars 205. The gaps 435 are sized to accommodate the covers 405 if one desires to include the covers in the settling basin collector chain 200. The covers 405 may be between about 0.03 inches (0.8 mm) and about 1/16 of an inch (1.6 mm) thick, and the gaps may be similarly sized. If one were to choose not to include the covers 405 in a portion or all of the settling basin collector chain 200, washers 440, illustrated in FIG. 9, may be inserted between the heads 220C of the connecting pins 220 and the outer sidewalls 410 of the outer side bars 205 and/or between the inner walls 415 of the outer side bars 205 and outer walls 420 of the inner side bars 205 to fill the space that would otherwise be present due to the gaps 435.

Figure 10:
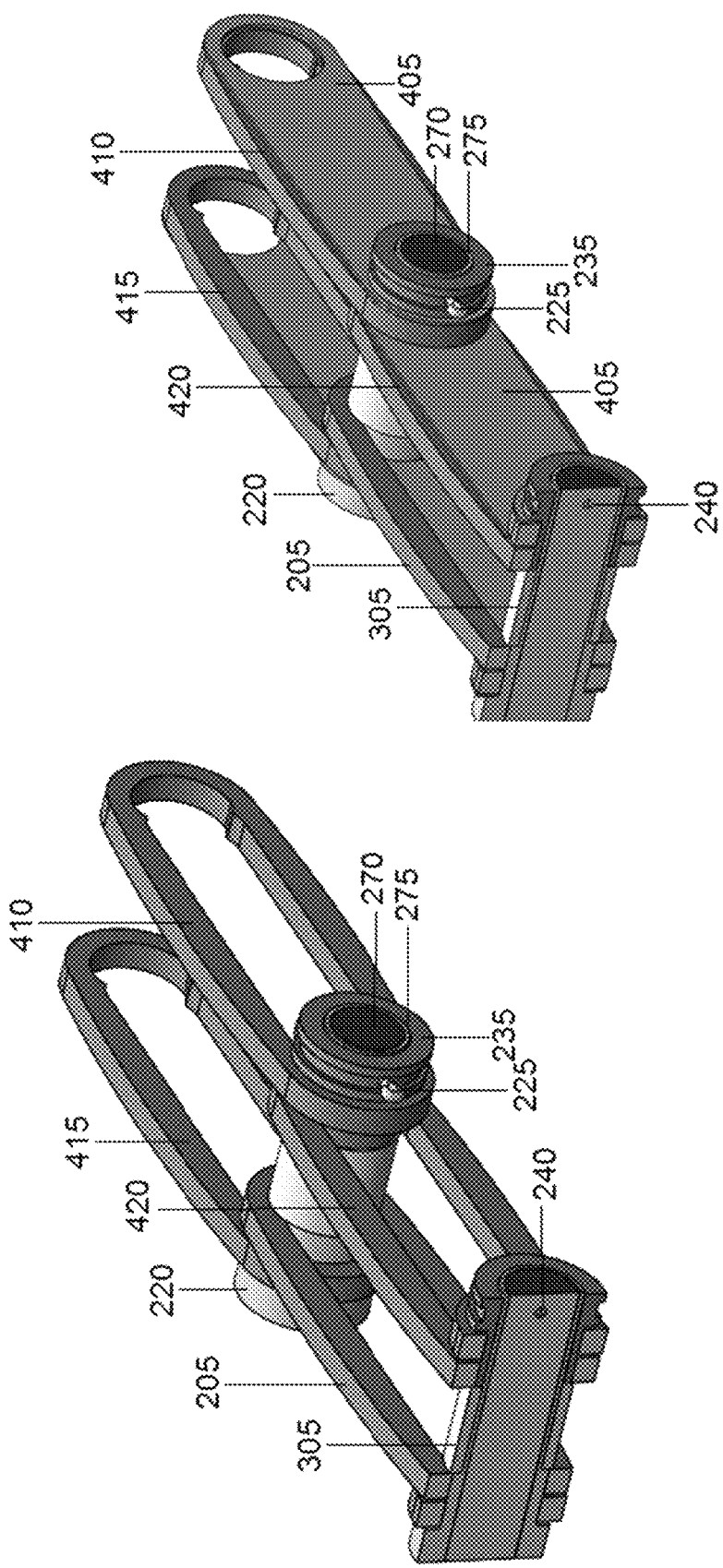
FIG. 10 is a partial cross-sectional view of a chain link assembly without covers and a chain link assembly with covers installed.

A comparison between settling basin collector chains 200 with and without covers 405 are illustrated in partial cross-section in FIG. 10.

Figure 11:
FIG. 11 illustrates a pattern of wear on a side bar of a chain link assembly due to frictional engagement with a roller of the assembly.

Further improvements to embodiments of the collector chain dive system disclosed herein may be made by replacing the rollers 305 as described above with flanged rollers. Rollers 305 as illustrated in, for example, FIG. 5B above are tubular structures having end portions 310 with the same thickness and cross-section as central portions 315. Relative motion between the faces of the end portions 310 of the rollers 305 and internal sidewalls 320 of the end sections 215 of the internal side bars 205 may cause wear on the internal sidewalls 320 of the end sections 215 of the internal side bars 205 and/or on the faces of the end portions 310 of the rollers 305. FIG. 11 illustrates an example of a wear pattern 355 on the internal sidewall 320 of the end section 215 of an internal side bar 205 that occurred in use due to frictional engagement with the face of an end portion 310 of a roller 305.

Figure 12A:
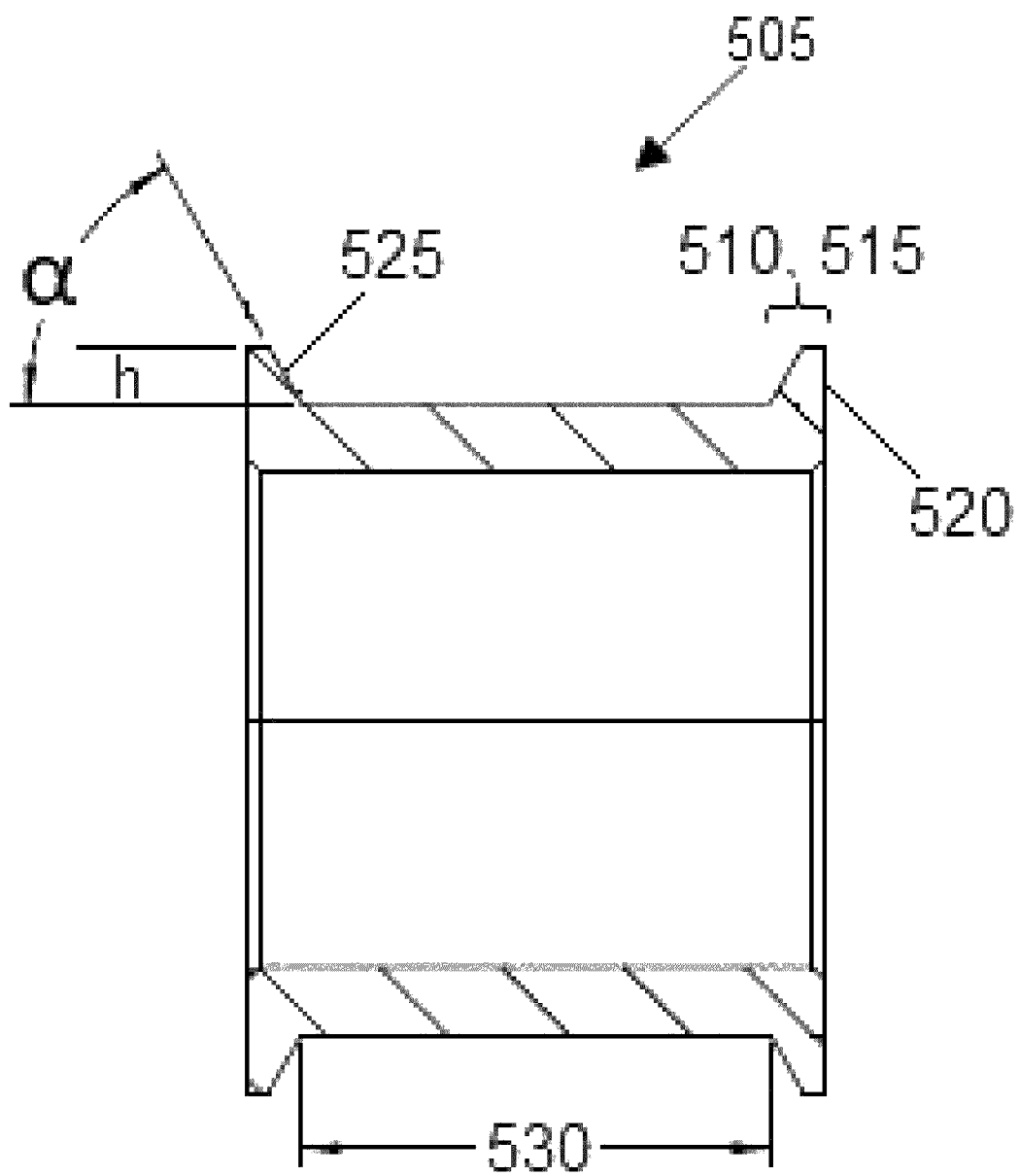
FIG. 12A is a cross-sectional view of an example of a flanged roller.
Figure 12B:
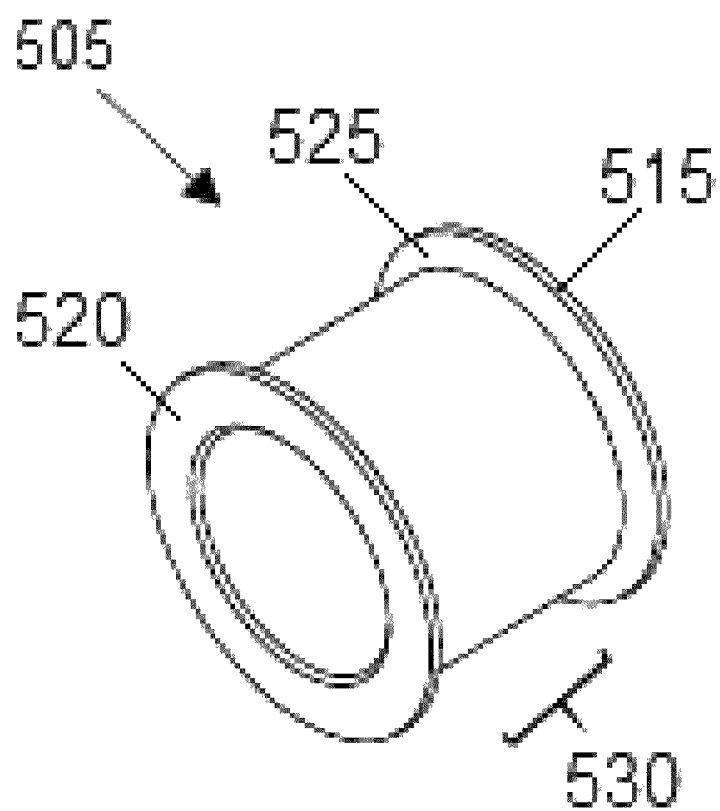
FIG. 12B is an isometric view of an example of a flanged roller.

Increasing the surface area of the faces of the end portions 310 of the rollers 305 may reduce wear between the rollers 305 and the internal sidewalls 320 of the end sections 215 of the internal side bars 205 by providing a lesser force per unit area between the two. The rollers 305 may thus be modified to be flanged rollers 505 include flanged end portions 510 as illustrated in cross-section in FIG. 12A and in isometric view in FIG. 12B. The flanged rollers 505 include flanges 515 on their end portions 510. The flanges 515 may have planar outer faces 520 and internally facing ramped sections 525 having surfaces disposed at an angle α of, for example, between 30° and 60° relative to the surfaces of the central portions 530 of the flanged rollers 505. The ramped sections 525 may help center the flanged rollers 505 on the various sprockets they pass over to help reduce or prevent relative motion between the flanged rollers 505 and sprockets that might otherwise cause wear to the sprockets and/or flanged rollers 505. The central portions 530 of the flanged rollers 505 may have widths corresponding to, or just wider than, the widest sprockets in the collector chain dive system to further minimize relative lateral motion between the flanged rollers 505 and the sprockets.

The flanges 515 may have a height "h" that just barely increases the surface area of the faces of the end portions 510 of the rollers, e.g., a height of greater than zero inches, up to a height corresponding to a width of the sidewalls 320 of the side bars 205, for example, up to two inches.

As with the rollers 305, the flanged rollers 505 may be free to rotate on the surfaces of the connecting pins 220 about axes of the connecting pins 220 between the inner side bars 205. The flanged rollers 505 may be formed of a hard, corrosion resistant material, for example, stainless steel to prevent or reduce wear on the connecting pins 220 due to contact with sprockets in a settling basin or may be formed of a low friction material, for example, nylon, fiber reinforced nylon, or KEVLAR® para-aramid synthetic fibers.

Figure 13:
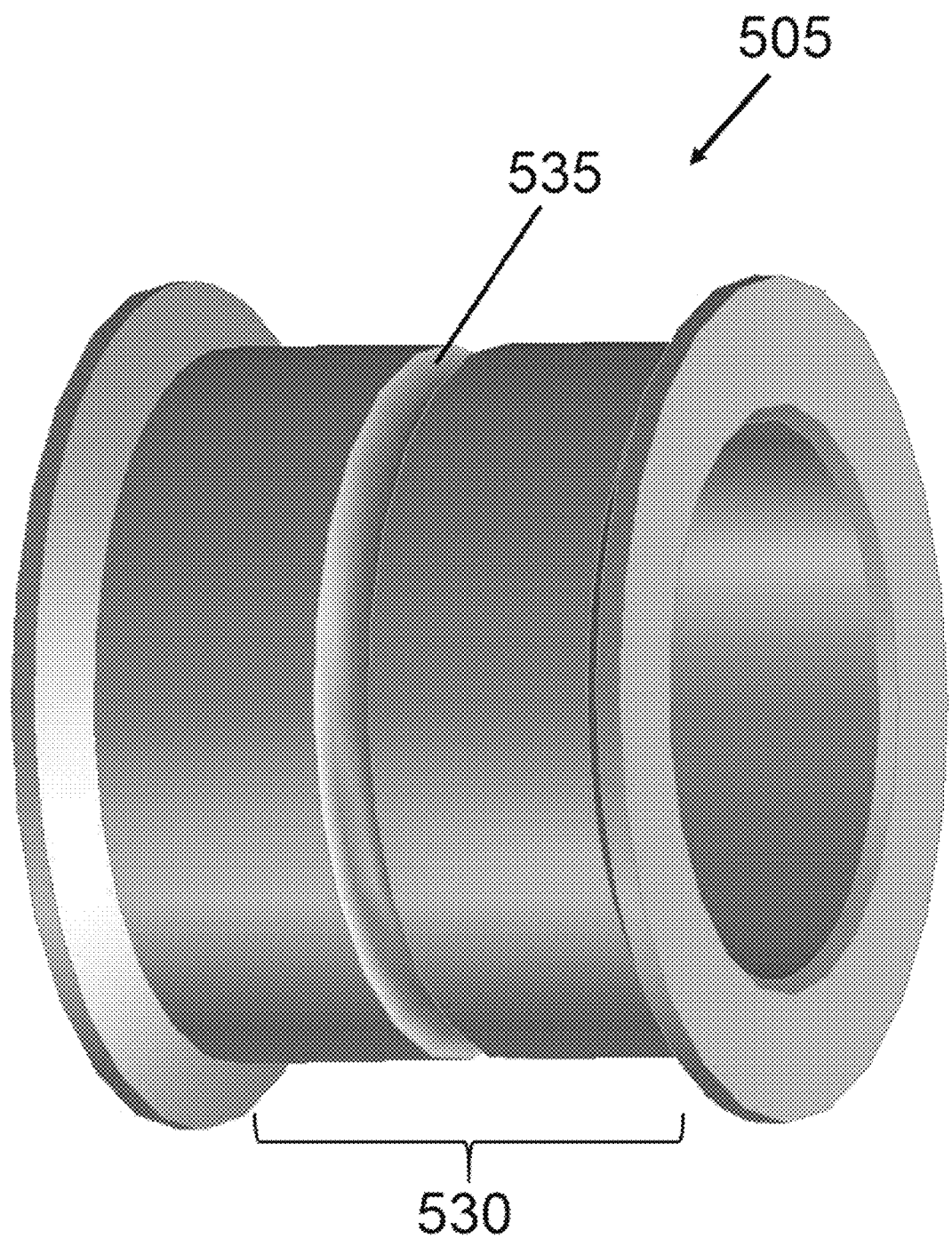
FIG. 13 illustrates an example of a flanged roller including a debris removal groove.

In some embodiments, the flanged rollers 505 may further include one or more circumferential grooves 535 within their central portions 530 as illustrated in FIG. 13. These one or more grooves 535 may help grit or other debris to escape from an area of contact with the flanged rollers 505 and any sprockets they may engage to reduce the amount of wear on the sprockets and/or flanged rollers 505 that might otherwise be caused by the grit or other debris.

Figure 14:
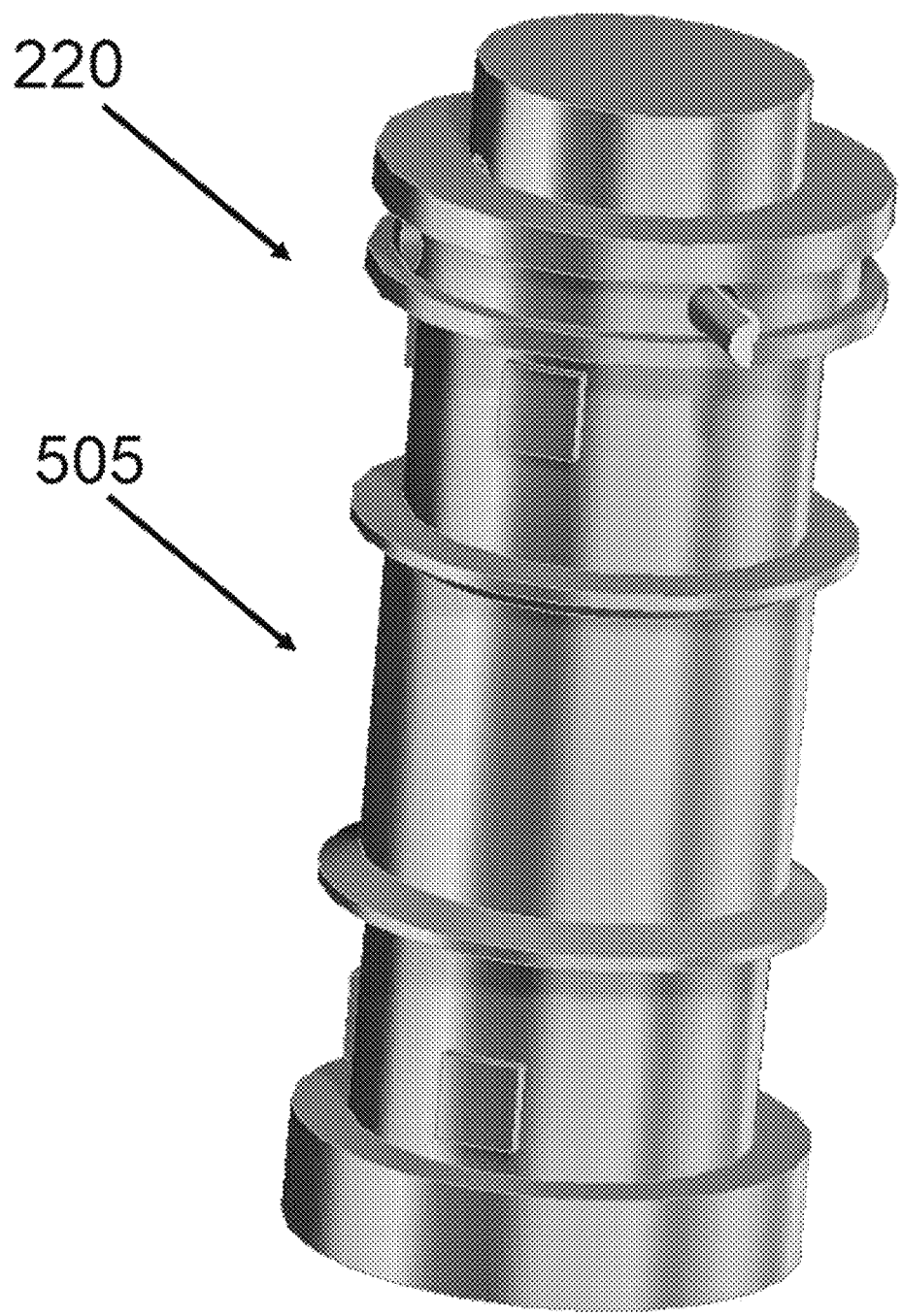
FIG. 14 illustrates an example of a flanged roller disposed on a connecting pin of a chain link assembly as disclosed herein.

FIG. 14 illustrates an embodiment of a flanged roller 505 disposed on an assembled stepped connecting pin 220.

In another aspect of the present disclosure, it is to be understood that an existing settling basin 100 may be retrofit to include any of the embodiments of the collector chain side bars or other portions of the collector chain drive system described herein.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. For example, although aspects of the present disclosure are described as used to remove biological floc from wastewater, these aspects may be equally applicable to the removal of any form of suspended solids, for example, inorganic suspended solids or fats, oil, or grease in a settling unit or vessel. Aspects of the wastewater treatment systems described herein may also use non-biological treatment methods rather than biological treatment methods for the treatment of wastewater. Accordingly, the foregoing description and drawings are by way of example only.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A settling basin of a wastewater treatment system, the settling basin comprising:
   a collector chain for driving a plurality of flights through the settling basin, the collector chain including chain links comprising:
   a plurality of side bars including a plurality of inner pairs of side bars and a plurality of outer pairs of side bars;
   connecting pins configured to join the plurality of side bars, each connecting pin including a first end and a second end on an opposite end of the connecting pin from the first end; and
   flanged rollers disposed on the connecting pins between the first ends and second ends, the flanged rollers including tubular central portions and end portions including flanges, one or more circumferential or crossing grooves being defined in the central portions of the flanged rollers.

2. The settling basin of claim 1, wherein the flanges include planar outer faces configured to engage inner side surfaces of the plurality of inner pairs of side bars.

3. The settling basin of claim 1, wherein the flanges include internally facing ramped sections having surfaces disposed at an angle of between 30° and 60° relative to surfaces of the central portions of the flanged rollers.

4. The settling basin of claim 1, wherein the flanges extend to heights above outer surfaces of the central portions of greater than zero inches and up to a height corresponding to widths of sidewalls of the plurality of inner pairs of side bars.

5. The settling basin of claim 4, wherein the height corresponding to widths of the sidewalls of the plurality of inner pairs of side bars is two inches.

6. The settling basin of claim 1, further comprising sprockets that the collector chain passes over, the central portions of the flanged rollers having widths corresponding to a width of a widest of the sprockets.

7. The settling basin of claim 1, wherein the flanged rollers are free to rotate about axes of the connecting pins.

8. The settling basin of claim 1, wherein the flanged rollers are formed of stainless steel.

9. The settling basin of claim 1, wherein the flanged rollers are formed of one of a fiber reinforced composite, acetal, or nylon.

10. A collector chain for driving a plurality of flights through a settling basin of a wastewater treatment system, the collector chain including chain links comprising:
    a plurality of side bars including a plurality of inner pairs of side bars and a plurality of outer pairs of side bars;
    connecting pins configured to join the plurality of side bars, each connecting pin including a first end and a second end on an opposite end of the connecting pin from the first end; and
    flanged rollers disposed on the connecting pins between the first ends and second ends, the flanged rollers including tubular central portions and end portions including flanges, one or more circumferential grooves being defined in the central portions of the flanged rollers.

11. The collector chain of claim 10, wherein the flanges include planar outer faces configured to engage inner side surfaces of the plurality of inner pairs of side bars.

12. The collector chain of claim 10, wherein the flanges include internally facing ramped sections having surfaces disposed at an angle of between 30° and 60° relative to surfaces of the central portions of the flanged rollers.

13. The collector chain of claim 10, wherein the flanges extend to heights above surfaces of the central portions of greater than zero inches and up to a height corresponding to widths of sidewalls of the plurality of inner pairs of side bars.

14. The collector chain of claim 13, wherein the height corresponding to widths of the sidewalls of the plurality of inner pairs of side bars is two inches.

15. The collector chain of claim 10, further comprising sprockets that the collector chain passes over, the central portions of the flanged rollers having widths corresponding to a width of a widest of the sprockets.

16. The collector chain of claim 10, wherein the flanged rollers are free to rotate about axes of the connecting pins.

17. The collector chain of claim 10, wherein the flanged rollers are formed of stainless steel.

18. The collector chain of claim 10, wherein the flanged rollers are formed of one of a fiber reinforced composite or nylon.

19. A method of retrofitting a settling basin of a wastewater treatment system, the method comprising replacing one or more rollers disposed on connector pins of links of a collector chain of the settling basin with one or more respective flanged rollers, the one or more respective flanged rollers including tubular central portions and end portions including flanges, one or more circumferential or crossing grooves being defined in the central portions of the one or more respective flanged rollers.

* * * * *